Figure 1:
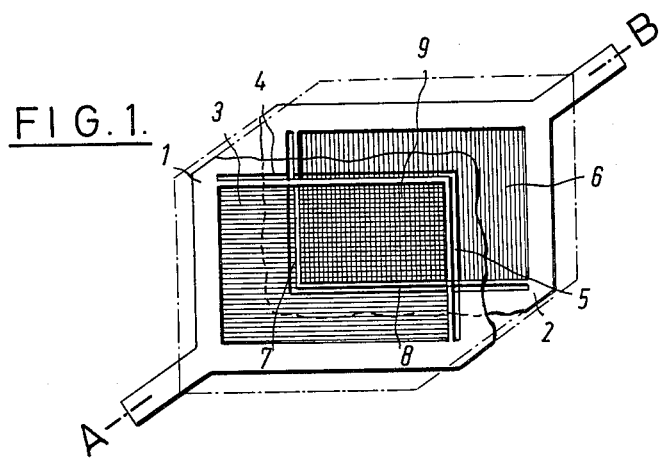

May 15, 1962 K. H. LANGE 3,034,394
OPTICAL VIEW-FINDER DEVICES
Filed Sept. 24, 1959

INVENTOR
KARL HEINZ LANGE

By

Attorney

United States Patent Office 3,034,394
Patented May 15, 1962

3,034,394
OPTICAL VIEW-FINDER DEVICES
Karl Heinz Lange, Bunde-Ennigloh, Germany, assignor to Balda-Kamerawerk Rudolf Gruter, Kommanditgesellschaft, Bunde, Germany, a company of Germany
Filed Sept. 24, 1959, Ser. No. 842,052
Claims priority, application Germany Sept. 24, 1958
1 Claim. (Cl. 88—1.5)

The invention relates to a device for the attainment of a continually variable view-finder field limitation for brilliant frame view-finders, that is to say, for the continual displacement of the aperture or the limitation of an optical sighting device, especially for view-finders of photographic cameras.

Devices have been known for a long time in which rectangular or square view-finder limiting apertures are formed by two diaphragms, movable in the direction of the diagonal of the view-finder cross-section of the finder, which effect through their displacement a diminution or enlargement of the view-finder aperture. These devices assume that the entire field of the view-finder is displayed through a light aperture.

Attempts have also been made to employ these devices in such view-finder systems as are customary in modern cameras in which, through a transparent mirror and full mirror, a bright frame is reflected in the image plane of the optical view-finder system, in order thus to attain also in this system a continual variation of the view-finder aperture.

A transfer of the first mentioned system of diagonally displaceable diaphragms for the purpose of aperture limitation to the last mentioned view-finder type with reflected bright frame is, however, frustrated in that the diaphragm-slides provided for the bright frames possess of necessity a dark inner ground or field. If now two diagonally-running diaphragm-slides are used, wherein each has a frame, then by a slight displacement of the dark portion of one slide the bright frame of the other would be uncovered, or if the inner field was correspondingly freed then the desired formation of the central dark field would no longer be guaranteed.

It is an object of the present invention to prevent the mutual screening by providing in the two diaphragms, displaceable towards each other in a diagonal direction, such optically different bright frame portions and central fields that two superimposed central grounds together are light-impermeable, whereas a central field and a frame portion together are light-permeable. In this connection various embodiments are conceivable, for example, the central dark field forming portions of the two diaphragms may consist of oppositely polarized filters whilst the frame portions are fully light-permeable. Another possibility in that colour filters may be used for the central field, the colours of which are mutually exclusive for the formation of the central dark ground, whilst they are visible in the frame portion. Furthermore, there may be used for the central field strip gratings channelled in the direction of diagonal displacement which supplement each other in the central field to form a dark field but develop in the completely light-permeable frame portions only a channelled screen.

The invention is more clearly explained by reference to the accompanying drawings which illustrate some embodiments. They show:

FIGURE 1, one embodiment of the invention employing a polarized central field.

Figure 2:
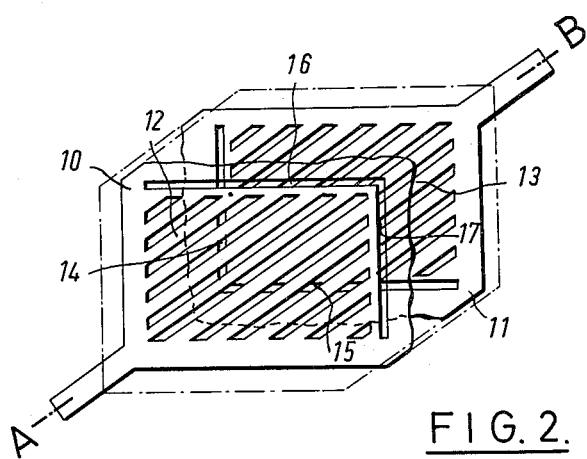

FIGURE 2, an embodiment with strip gratings.

In the embodiment illustrated in FIGURE 1 two diaphragms 1 and 2 are provided, the first having a central field 3 with horizontal light polarization, indicated by horizontal lines, together with two fully light-permeable frame portions 4 and 5. The second diaphragm on the contrary has a central field 6 with vertical light polarization, indicated by vertical lines, as well as two fully light-permeable frame portions 7 and 8 which lie opposite to the frame portions 4 and 5 of the other diaphragm. FIGURE 1 shows the two diaphragms overlapping to give a diminished central ground 9 in which the directions of polarization are crossed and which accordingly is light-impermeable. On the other hand the accompanying frame portions in which the light is only once polarized are, furthermore, visible. The portions of the central field lying outside the remaining bright frame portions, as well as the residual frame portions are naturally completely uncovered by the dotted line indicated edge portions of the other diaphragm and are invisible. By diagonal displacement along the direction A—B the size of the view-finder field can be altered as desired.

The fields 3 and 6 may be formed as colour filters instead of by different polarization directions, the characteristic of the colour filter being so chosen that the colour transmittable through one of the filters is absorbed by the other filter. The remaining bright frame portions then appear in the transmitted colour of the filter of the neighbouring diaphragm whilst the central field is dark.

In the embodiment according to FIGURE 2 the central fields of the diaphragm 10 and 11 are formed by strip gratings 12 and 13 which are so constructed that they supplement each other in the zone of overlap to give a dark field. The bright frame portions 14, 15 and 16, 17 are, contrariwise, fully light-permeable. In the corresponding overlapping of the two diaphragms 10 and 11 the frame portion accordingly shows a strip pattern whilst the mutual central field and likewise the outer portions of the central field are dark. The reflected light frame when in the broken line track accordingly remains clearly distinguishable.

I claim:

In an optical light frame view-finder device, two diaphragms superimposed upon one another, each of said diaphragms having a central rectangular field and having two bright straight frame line portions arranged at right angles to one another, said frame line portions being located adjacent diagonally opposed corners of said rectangular fields of said diaphragms, light-impermeable framing surrounding said central fields, means for displacing said two diaphragms opposite to one another in the direction of a diagonal line of said rectangular fields so that said frame line portions continuously intersect one another, and alternating dark and light stripes in said central rectangular fields of said diaphragms, said stripes extending in the direction of said diagonal line of said diaphragms and being arranged in such manner that said dark and light stripes of one of said diaphragms are interposed alternatingly with said stripes of said other diaphragm for forming a dark central field upon said displacement of said diaphragms relative to one another in said direction of said diagonal line, leaving at least a partially continuous bright frame line surrounding said dark central field visible within said bright frame line portions of said diaphragms, providing a view-finder field having a size variable in infinitely fine increments.

References Cited in the file of this patent
UNITED STATES PATENTS

| | | |
|---|---|---|
| 2,331,667 | Eaton | Oct. 12, 1943 |
| 2,805,608 | Leitz et al. | Sept. 10, 1957 |

FOREIGN PATENTS

| | | |
|---|---|---|
| 701,041 | Great Britain | Dec. 16, 1953 |